United States Patent [19]

Pacanovsky et al.

[11] Patent Number: 5,634,972
[45] Date of Patent: Jun. 3, 1997

[54] HYDRATION CONTROL OF CEMENTITIOUS SYSTEMS

[75] Inventors: John T. Pacanovsky, Savannah, Ga.; Lan Huang, Cleveland, Ohio; Frank T. Gay, Twinsburg, Ohio; Samy M. Shendy, Cuyahuga Falls, Ohio

[73] Assignee: Sandoz Ltd., Basel, Switzerland

[21] Appl. No.: 596,901

[22] Filed: Mar. 13, 1996

Related U.S. Application Data

[63] Continuation of Ser. No. 309,277, Sep. 20, 1994, abandoned.

[51] Int. Cl.$^6$ .......................... C04B 24/04; C04B 24/06
[52] U.S. Cl. .......................... 106/696; 106/724; 106/728; 106/819; 106/823; 427/427
[58] Field of Search .......................... 106/696, 724, 106/728, 819, 823; 427/427

[56] References Cited

U.S. PATENT DOCUMENTS

| | | | |
|---|---|---|---|
| 3,600,203 | 8/1971 | Aldera . | |
| 3,656,985 | 4/1972 | Bonnel et al. . | |
| 3,826,665 | 7/1974 | Decines et al. | 106/104 |
| 3,926,650 | 12/1975 | Lange et al. . | |
| 4,159,912 | 7/1979 | Jorgenson | 106/788 |
| 4,264,367 | 4/1981 | Schutz | 106/90 |
| 4,676,832 | 6/1987 | Childs et al. | 166/293 |
| 4,767,460 | 8/1988 | Parcevaux | 106/696 |
| 4,772,327 | 9/1988 | Allemann et al. . | |
| 4,804,563 | 2/1989 | Hillemeier et al. | 427/427 |
| 4,964,917 | 10/1990 | Bobrowski et al. | 106/804 |
| 5,269,845 | 12/1993 | Grunau et al. | 427/427 |
| 5,340,612 | 8/1994 | Perito | 427/427 |
| 5,356,671 | 10/1994 | Drs | 427/427 |
| 5,387,283 | 2/1995 | Kirkpatrick et al. | 106/709 |

FOREIGN PATENT DOCUMENTS

| | | | |
|---|---|---|---|
| 2828988 | 1/1979 | Germany | 106/728 |
| 0017426 | 2/1975 | Japan | 106/728 |
| 0174428 | 2/1975 | Japan | 106/728 |
| 0088033 | 8/1978 | Japan | 106/696 |
| 54-001733 | 8/1979 | Japan . | |
| 55-104952 | 8/1980 | Japan . | |
| 01257156 | 10/1989 | Japan . | |
| 1522501 | 8/1978 | United Kingdom . | |
| 1522502 | 8/1978 | United Kingdom . | |
| 2033367 | 5/1980 | United Kingdom . | |

OTHER PUBLICATIONS

Chemical Abstract 112:239697, Tsuchida, (Mikio, Storable, High Concentration Aqueous Calcium Nitrite Solutions), JP 01257112 (Oct. 1989).

*Primary Examiner*—Paul Marcantoni
*Attorney, Agent, or Firm*—Robert S. Honor; Carl W. Battle; Carol A. Loeschorn

[57] ABSTRACT

A method of controlling the hydration of a cementitious composition comprising the steps of:

i) providing a cementitious composition containing an amount of a neutralized salt of an alpha-monohydroxy carboxylic acid effective to retard the cementitious composition, said carboxylic acid containing two or more carboxylic acid groups, and subsequently, ii) adding an additional amount of said neutralized salt of an alpha monohydroxy carboxylic acid or a second neutralized salt of an alpha monohydroxy carboxylic acid in an amount sufficient to activate hydration of the retarded cementitious composition, said cementitious composition comprising hydraulic binder and water.

33 Claims, No Drawings

HYDRATION CONTROL OF CEMENTITIOUS SYSTEMS

This is a continuation of application Ser. No. 08/309,277, filed Sep. 20, 1994, now abandoned.

BACKGROUND OF THE INVENTION

1. Field of the Invention

This invention relates to hydration control of cementitious systems and more particularly to the use of neutralized salts of α-monohydroxy di- and multifunctional carboxylic acids to obtain hydration control.

2. Description of the Related Art

Hydration control refers to control over the setting time of cement, i.e. controlled retardation followed by subsequent activation of cement hydration. Hydration control is useful in a number of different situations, e.g. in the reclaiming of unused concrete such as described in U.S. Pat. No. 4,964,917, in situations where concrete is prepared at a remote location and subsequently transported to the worksite in a set delayed state for reasons of expense and/or convenience such as described in U.S. Pat. No. 4,676,832 for cementing operations carried out, e.g. in offshore platform grouting, and in shotcrete applications where long worktimes followed by very rapid set are often required.

Hydration control may be desired from initial mixing or at some later time after hydration has already begun. In the situation where the cementitious composition is prepared at a remote location and then transported to the worksite, retardation is desired from the outset with subsequent activation at some later point. In other situations, e.g. the reclaiming of concrete, hydration of the cement has already begun but needs to be retarded for a period of time, generally overnight or for a weekend, until it is desired to use the concrete.

Hydration control has been achieved in some situations using two different admixtures, i.e. a retarder to delay the set and an accelerator to activate the set of the cementitious system. However, many of the materials commonly employed as retarders are acidic, e.g. gluconic acid, citric acid and phosphoric acid, having a pH of less than 2.5, while most of the traditional accelerators are basic, e.g. strongly alkaline solutions of silicates and aluminates, having a pH greater than 12 and therefore, both admixtures are undesirable from environmental and safety standpoints.

SUMMARY OF THE INVENTION

The present invention provides a convenient and safe method to obtain hydration control of cementitious systems comprising a hydraulic binder. Specifically, hydration control of cementitious systems has unexpectedly been achieved by adjusting the dosage of a single admixture, i.e. a neutralized salt of a α-monohydroxy di- or multifunctional carboxylic acid. At low dosages, usually below 4% by weight based on the weight of the hydraulic binder, the neutralized salts act as retarders. At higher dosages, i.e. greater than about 5% up to about 8% by weight based on the weight of the hydraulic binder, the neutralized salts reverse their roles and act as accelerators. Since the neutralized salts of the present invention have a pH in aqueous systems of between 7.5 and 8.3, the obvious safety and environmental hazards associated with manufacture, transportation and application of many of the traditional retarders and/or accelerators are eliminated. In addition, since one admixture can be used to both retard (stabilize) and then reactivate the hydration of a cementitious system, the present invention makes it easier, safer, more convenient and more efficient for the end user to obtain hydration control.

The present invention is particularly useful in shotcreting, and more particularly in wet-shotcreting, where the applied cementitious composition must set quickly after application. In another embodiment, the present invention is useful in underground concreting applications where stabilization is required for a certain period, followed by only slightly accelerated setting times and rapid strength development. In a still further embodiment, the present invention is useful in reclaiming left-over concrete.

DETAILED DESCRIPTION OF THE INVENTION

As used herein, the term "concrete" means a mixture comprising water, a cementitious material and aggregate.

Specifically, the invention is directed to a method for controlling the hydration of a cementitious composition comprising the steps of i) providing a cementitious composition containing a retarding amount of a neutralized salt of a α-monohydroxy di- or multifunctional carboxylic acid to form a retarded cementitious composition and, when activation is desired, ii) adding in an additional amount of said neutralized salt of a α-monohydroxy di- or multifunctional carboxylic acid or a second neutralized salt of a α-monohydroxy di- or multifunctional carboxylic acid in an amount sufficient to activate the retarded cementitious composition, said cementitious composition comprising a cementitious material and water.

By activating the retarded composition is meant that the hydration and setting of the retarded composition will occur faster than it would have absent the activation. By modifying the amount of additional neutralized salt added to the retarded cementitious composition, the activation of hydration can result in a retarded set time, the same set time or an accelerated set time relative to a cementitious with no retardation or acceleration.

The water-soluble neutralized salts of α-monohydroxy di- and multifunctional carboxylic acids of the present invention contain two or more carboxylic acid groups and one hydroxy group which is in a position α to one of the carboxylic acid groups. The term "neutralized salt" means that all the carboxylic acid groups exist in their salt form. Specific examples of suitable neutralized salts include the neutralized salts of citric, malic acid and citramalic acid. The preferred neutralized salts are alkali metal salts, particularly lithium, potassium and sodium salts, e.g. trilithium and tripotassium citrate and dilithium and disodium realate and citramalate. Particularly preferred materials are the neutralized salts of citric acid since they tend to impart better physical properties, e.g. higher compressive strength, particularly high early compressive strength, in the hardened cementitious composition relative to other water-soluble neutralized salts of α-monohydroxy di- and multifunctional carboxylic acids. Lithium salts of α-monohydroxy di- and multifunctional carboxylic acids are preferably used where the alkali-silica reaction is a concern, since it is well known that lithium salts inhibit the alkali-silica reaction.

The neutralized salts of α-monohydroxy di- and multifunctional carboxylic acids are generally commercially available or they can be produced from the corresponding available acid. If the acid is not commercially available, it can be made by procedures well-known in the art.

It is usually preferred to use the same neutralized salt for both retardation and subsequent activation. However, in some specific applications it may be desirable to use a combination of two or more neutralized salts of α-monohydroxy di- or multifunctional carboxylic acids for achieving hydration control. For example, neutralized citric acid salts impart a plasticizing effect (more so than some of the other neutralized salts, e.g. malic acid salts) which is undesirable in certain applications, e.g. in shotcreting applications. On the other hand, as mentioned above, neutralized citric acid salts have been found to enhance compressive strength, particularly early compressive strength (more so than the other neutralized salts), which is very desirable in shotcreting. One way to balance these effects in shotcrete applications and gain hydration control is to use a combination of neutralized salts, i.e. a citric acid salt to retard and a malic acid salt to activate. This combination gives good overall results in terms of hydration control, workability and physical properties of the hardened cementitious composition.

However, the plasticizing effect of the neutralized salts, particularly the citric acid salts, may be compensated for in other ways so that a single neutralized salt may effectively be used to gain hydration control in shotcreting. For example, a rheology modifying material capable of imparting thixotropic properties may be added to the cementitious composition and/or the activating amount of a neutralized salt can be added to the cementitious composition in the delivery hose at a position before it reaches the nozzle thereby minimizing the adverse plasticizing effects.

Useful rheology modifying materials which will impart thixotropic properties to the composition are materials such as described in WO 92/11982 and which comprise a water-soluble poly(alkylene oxide), a β-naphthalene sulphonate-formaldehyde condensate and, optionally, a plasticizer or superplasticizer selected from the group consisting of lignosulphonates, melamine sulphonate formaldehyde condensates, polycarboxylates and certain styrene-maleic anhydride based copolymers in free acid or salt form; cellulosic materials; gums and clays; polyacrylic acids having weight average molecular weights in excess of 50,000; and modified styrene butadiene rubber (SBR) latexes, such as carboxylated styrene-butadiene copolymer latex. The preferred rheology modifying materials are the SBR modified latexes. The rheology modifying material is generally added into the cementitious composition in the delivery hose preferably after the activating amount of neutralized salt has been added. The rheology modifying materials are usually added to the cementitious composition as aqueous solutions, generally in amounts of 0.5 to 2% by weight based on the weight of the cement.

By adding in the activating amount of neutralized citric acid salt to the cementitious composition further down the line in the delivery hose prior to reaching the nozzle, e.g. at the pulsation attenuator, the plasticizing effect will not be as pronounced since the cementitious composition with activating salt will have had additional time in the line and will harden almost instantaneously upon contact with the surface on which it is sprayed. A particularly preferred embodiment of the present invention for obtaining hydration control in shotcreting is to introduce the activating amount of a water-soluble citric acid salt into the cementitious composition in the delivery hose at the pulsation attenuator and subsequently introducing a rheology modifying material in the delivery hose at the nozzle.

As mentioned above, the retarding amount of the neutralized salts of the present invention can be added when initially mixing the cement, or after cement hydration has already begun. The neutralized salts are preferably added as aqueous solutions, generally at concentrations of about 50% by weight of neutralized salt. However, for the less soluble salts, e.g. the lithium salts, the concentrations would be less than 50% by weight of neutralized salt.

Where retardation is desired from the outset, the neutralized salt is added to the cementitious composition on batching, preferably after the cement has been mixed with water in order to achieve optimal retardation. Retardation from the outset may be obtained for a time period ranging up to about 1 month, although normally, retardation is generally desired for periods up to about 72 hours.

Where retardation is desired at some point after hydration has already begun, e.g. in reclaiming situations, it is preferable that the retarding amount of the neutralized salts be added to the cementitious composition before initial setting occurs, generally within 0.5 to 7 hours after initial mixing, more preferably 1 to 4 hours after initial mixing. Usually, concrete is placed within 1.5 hours of mixing and the neutralized salt would be added at the end of the placing period to any unused portion of the concrete. However, the actual time of adding the retarding agent may be prolonged if the cementitious composition retains the required slump, air content and unit weight.

The amount of neutralized α-monohydroxy di- or multifunctional carboxylic acid required to retard a given cementitious composition will depend upon the length of time retardation is desired, the temperature of the cementitious mix, the water to cement (W/C) ratio and the cement composition, i.e. cement type and cement factor, with about 0.05 to 4%, preferably 1 to 3% by weight of the neutralized salt based on the weight of the cement generally providing stabilization for up to 1 month. The cement factor is a measure of the quantity of cement in a given volume of the cementitious composition.

The amount of additional neutralized salt required to activate the system will also vary depending upon the specific cementitious system, the temperature of the cementitious mix, and the desired set time with an additional amount of neutralized salt to yield a total of up to about 8% by weight (retarding amount plus activating amount) of the neutralized salt, based on the weight of cement, affording the quickest activation. An amount of neutralized salt in excess of about 8% by weight, based on the weight of the hydraulic cement, generally has no increased effect on set time, although amounts up to 20% by weight or more may be employed depending upon the final formulation, objectives and conditions of use. Adjusting the dosage of neutralized salt allows for a range of set times, i.e. faster, slower or the same as would have been obtained absent retardation.

The cementitious compositions comprise a cementitious material and water. The "cementitious material" is a hydraulic binder which when mixed with water will set to form a hard product. Preferably, the cementitious material is a material which comprises hydraulic cement, i.e. a commercially produced calcium alumino-silicate mineral blend, which when mixed with water will set to form a hard product. The most common type of hydraulic cement is portland cement, i.e. types I–V portland cement, and for purposes of this invention, portland cement is the preferred cementitious material. Other hydraulic binders useful in the present invention include high alumina cement, slag cement and fly ash, e.g. class C fly ash. One hydraulic binder or any combination of two or more may be used as the cementitious material.

In addition to cement and water, the cementitious compositions of the present invention generally include aggregate. The aggregate may be any material known in the art to be useful as such, e.g. sand, stone, gravel, quartz, marble, plastic, and metallic aggregate.

In typical applications, the aggregate is generally present in a weight percent of from 60–85%, preferably 65–75% by weight, based on the total weight of dry components (cement, mineral admixtures and aggregate) present.

In shotcrete applications, a fine aggregate such as sand is usually employed although larger aggregate, e.g. pea gravel (maximum diameter of 0.375 inch), may also be used provided the nozzle is of suitable size. In typical shotcrete applications the amount of aggregate will be present in a weight percent of from 25 to 85%, more usually from 50 to 80%, and particularly from 60 to 80% by weight, based on the total weight of dry components (cement, mineral admixtures and aggregate) present.

The cementitious compositions may include other materials commonly present in cementitious systems to modify the properties thereof, provided these materials do not substantially interfere with the hydration control ability of the neutralized salts. Examples of such materials include high-range water reducing admixtures, air entraining admixtures and mineral admixtures, e.g. silica fume, glass fibers, polymeric fibers, steel fibers, and fly ash. Agents to provide cohesion or bonding of the applied cement composition, such as polyvinyl alcohols, may also be used.

The amount of water to be included in the cementitious compositions of the invention will vary depending upon the particular application and other known factors, but is always sufficient for the hydraulic setting of the cement. Generally, water is added in an amount to yield a water to cement (w/c) ratio of less than 0.45, with a w/c ratio in the range of 0.35 to 0.40 being preferred. If the neutralized salt is a water-soluble citric acid salt, the amount of water may be less than that otherwise indicated for a particular application, since the water soluble citrates have been found to have a solids dispersing effect. In shotcrete applications, the amount of water used is preferably kept at a minimum to avoid undesired fluidity.

The method of hydration control of the present invention is useful for preparing set delayed cementitious compositions which are to be transported to a different location for use for e.g. in off-shore platform grouting such as described in the aforementioned U.S. Pat. No. 4,676,832, the contents of which are hereby incorporated by reference, and in underground concreting applications.

In underground concreting applications, stabilization is required for transport of the concrete underground, followed by a slightly accelerated set time with rapid strength development. In underground applications, the concrete is mixed above ground in traditional ready mix fashion to which is added a retarding amount of the neutralized salts of the present invention, and then the concrete mix is dropped down a vertical shaft to rail cars underground. The concrete is then transported in the cars to the desired location where it is then remixed (at which point the accelerating amount of neutralized salt is added) and the remixed concrete is pumped into forms. Stabilization, generally for periods of up to about 8 hours may be needed for transport, followed by three hours of work time after remixing. A compressive strength of at least 1200 psi in 12 hours is required for demolding.

The method of the present invention is particularly useful for obtaining hydration control in rapid setting concrete compositions, such as in shotcreting as mentioned above. In shotcreting, the cementitious composition is pneumatically conveyed at high velocity onto a surface. Shotcreting can be carried out using a dry-mix cement composition (the dry-mix system) or a wet-mix cement composition (the wet-mix system), as described below.

The dry-mix system is a system in which dry mixed cement and aggregate are mixed and pneumatically conveyed through a delivery hose, with water and a quick-set agent being added in the vicinity of the nozzle, generally within the nozzle assembly or upstream of the nozzle, just prior to passage into the nozzle assembly. The mixture is applied onto the requisite surface by pneumatically projecting it out from the nozzle under pressure, e.g. by means of compressed air. It is difficult to control the quantity of water added and therefore, the water/cement ratio with the dry mix system and unwanted dust is usually generated.

The wet-mix system is a system in which the cement and aggregate are mixed in the presence of water and the resulting wet mixture is pneumatically conveyed through a delivery hose to a nozzle and projected out of the nozzle under pressure onto the requisite surface. The quick-set agent is added in the vicinity of the nozzle, generally within the nozzle assembly itself, or upstream of the nozzle just prior to passage into the nozzle. The wet-mix system allows good control of the water/cement ratio and generates little dust. However, work interruptions are a common occurrence and require that the delivery hose be emptied out and cleaned in order to avoid clogging the hose with partially or completely hardened concrete.

In both the dry-mix and wet-mix systems conveying may, in part, be carried out by pumping followed by pneumatically conveying the concrete out of the nozzle.

Pressures employed in the pneumatic delivery of cement compositions in shotcreting generally range from 60 to 140 psi, and are more usually 80 to 120 psi.

The present invention is particularly useful in wet-mix shotcreting, wherein the retarding amount of neutralized salt is added into a mixture of cement, aggregate and water and the activating amount of neutralized salt is added in at some point in the delivery hose, preferably upstream of the nozzle at some point prior to passage into the nozzle, e.g. at the pulsation attenuator. Alternatively, the activating amount of neutralized salt may be added in at the nozzle. The hydration control method of the present invention allows for work interruptions while shotcreting without the need to clean the lines and also provides the super-quick set times required in such applications.

In another embodiment, the method of hydration control of the present invention is useful in reclaiming concrete left-over at the end of the workday, such as described in U.S. Pat. No. 4,964,917, the contents of which are hereby incorporated by reference. Specifically, the present invention provides for a method of reclaiming concrete comprising the steps of i) retarding the hydration of concrete to be reclaimed by adding to the concrete a retarding amount of a neutralized salt of a α-monohydroxy di- or multifunctional carboxylic acid to form retarded concrete, and when it is desired to restore the concrete to a settable state, ii) adding to said retarded concrete or a mixture thereof with fresh concrete an additional amount of a neutralized salt of a α-monohydroxy di- or multifunctional carboxylic acid in an amount effective to reactivate the hydration of the retarded concrete or mixture thereof with fresh concrete.

When reclaiming concrete, the activating amount of neutralized salt can be added directly to the retarded concrete or the retarded concrete may first be mixed with fresh concrete just prior to adding in the additional amount of neutralized salt necessary to reactivate the hydration. The amount of retarded concrete may range from about 5% to about 100%, by weight, while the amount of fresh concrete will range from 95% to 0%. Preferably, the amount of retarded concrete will range from about 10% to about 30% while the amount of fresh concrete will range from about 90% to about 70%.

In situations where the retarded concrete is mixed with fresh concrete prior to reactivation, the overall concentration of neutralized salt in the combined mixture will be lower than the concentration of neutralized salt in the retarded concrete. Thus, more neutralized salt than would have been required absent the fresh concrete, will be necessary to achieve an activating mixture.

The following examples are offered in order to further illustrate the present invention, and are not intended to be limiting. It is noted that the cement, silica fume, sand and water used in the examples was mixed thoroughly prior to the addition of the retarding amount of neutralized salt in order to achieve maximum stabilization of the system, unless otherwise noted. In the examples, setting time and compressive strength measurements conform to American Society for Testing and Materials Methods C 266 and C 109, respectively. All the measurements were taken at room temperature. The setting time is measured from the time of the second addition (activating amount) of neutralized salt.

EXAMPLE 1

Medusa I portland cement (1150 g), silica fume (100 g) and silica sand (3750 g) were blended together and added to 356 g of water in the mixing bowl of a Hobart lab mixer. The resulting mortar was mixed for an initial two minutes. Into the mixing bowl was then added 17.65 g of a tripotassium citrate (TPC) solution (66% by weight TPC) and the mortar was mixed for an additional minute. The mortar was then held in a set delayed state in the mixing bowl for 72 hours. At the end of the 72 hours, an additional 122 g of the TPC solution was added to the mortar and mixed for 30 seconds. A set of test specimen (2"×2" compressive strength cube mold) were cast immediately. The initial and final setting times as well as the compressive strength at various times is given in Table 1. A second mortar was prepared as above except that trilithium citrate (TLC) was used in place of the TPC in an equivalent weight amount. The set times and compressive strength data are reported in Table 1 (TLC) along with similar data measured for reference test specimen (REF). The reference was prepared in an analogous manner except that there was no citric acid salt added and the amount of water added was 402.5 g.

TABLE 1

|  | TPC | TLC | REF |
| --- | --- | --- | --- |
| Initial Set | 3 min, 10 sec | 4 min, 40 sec | 2 hrs, 38 min |
| Final Set | 6 min, 0 sec | 7 min, 50 sec | 5 hrs, 10 min |
| 1 Hr. Compressive Strength | 1443 psi | 1143 psi | n/a |
| 4 Hr. Compressive Strength | 1880 psi | 1580 psi | n/a |
| 1 Day Compressive Strength | 3520 psi | 3020 psi | 2840 psi |
| 7 Day Compressive Strength | 4740 psi | 4640 psi | 4690 psi |
| 28 Day Compressive Strength | 5810 psi | 5700 psi | 5700 psi |

EXAMPLE 2

Medusa I cement (1000 g) and C109 silica sand (2000 g) were blended together and added to 340 g of water in the mixing bowl of a Hobart lab mixer. The resulting mortar was mixed for an initial two minutes. Into the mixing bowl was then added 40 g of an aqueous dipotassium malate (DPM) solution (50% by weight DPM; 2% DPM by weight based on the weight of the cement), and the mortar was mixed for an additional minute. The mortar was then held in a set delayed state in the mixing bowl for 24 hours. At the end of the 24 hours, an additional 100 g of the aqueous DPM solution was added (5% additional DPM) to the mortar and mixed for 30 seconds. Test specimen, as in example 1, were cast immediately. The initial setting time was 5 min, 30 sec and the final set was 8 min, 50 sec. The compressive strength at 1 hour was 766 psi; at 1 day, 2920 psi; at 7 days, 4411 psi; and at 28 days, 5650 psi.

EXAMPLE 3

This example shows the effect increasing amounts of tripotassium citrate (TPC) have on the final setting time of a cementitious system which comprises of Medusa I portland cement, 75% silica sand, 2% silica fume and sufficient water to give a water/cement ratio of 0.375. The dry ingredients were combined and mixed. To this dry mixture was added the indicated amount of tripotassium citrate (which had been dissolved in the mix water) all at once. The mortar was mixed for an initial two minutes, and then an additional 30 seconds. Test specimen (as in example 1) were cast immediately. The amount of TPC, in percent by weight based on the weight of cement, and the final set time (measured from the time of addition of TPC) are indicated in Table 2.

TABLE 2

| Dosage of TPC (wt % based on cement) | Final Set Time |
| --- | --- |
| 0.0 | 4.5 hrs. |
| 0.25 | 36 hrs. |
| 0.50 | 44 hrs. |
| 1.0 | 22 days |
| 2.0 | 20 days |
| 3.0 | 1 month |
| 4.0 | 48 hrs. |
| 5.0 | 2 hrs. |
| 6.0 | 30 min. |
| 7.0 | 10 min. |
| 8.0 | 5 min. |

As can be seen from Table 2, lower dosages of TPC, up to about 4% in this example, retard the set time of the cementitious system whereas dosages in excess of 4% activate the set time relative to the same cementitious system without TPC. Longer or shorter set times may be obtained using the same dosages of TPC but altering the factors discussed above, e.g. water/cement ratio, temperature, cement type and cement factor, and such is within the ability of one skilled in the art.

EXAMPLE 4

Two cementitious test specimen were prepared and cast following the general procedure of Example 1 using 65% silica sand, 35% Medusa I cement and sufficient water to give a water/cement ratio of 0.40. In one of the systems, 3% by weight of tripotassium citrate (TPC) was added to stabilize the cementitious mix and 4% by weight of dipotassium malate (DPM) was added to activate the system. In the other system, 3% DPM was added to stabilize the system and 4% more of DPM was added to activate the system. The initial and final set times and the compressive strength, measured at different time intervals, are given in Table 3.

TABLE 3

|  | TPC/DPM | DPM/DPM | REFERENCE |
| --- | --- | --- | --- |
| Initial Set | 5 min | 6 min, 55 sec | 3 hr, 10 min |
| Final Set | 7 min, 45 sec | 10 min, 35 sec | 4 hr, 56 min |
| 1 Hour Compressive Strength (psi) | 531.5 | 460 | — |
| 4 Hour Compressive Strength (psi) | 1734 | 1525 | — |
| 1 Day Compressive Strength (psi) | 2693 | 2800 | 2540 |
| 7 Day Compressive Strength (psi) | 3750 | 4081 | 3805 |
| 28 Day Compressive Strength (psi) | 4725 | 4525 | 4690 |

EXAMPLE 5

Six sets of test specimen were prepared and cast as in example 4 using the same relative amounts of Medusa I cement, silica sand and water. In three of the systems, 1% tripotassium citrate (TPC) was added to stabilize the systems for 72 hours. At the end of the 72 hours, a different amount of TPC was added to each system, i.e. 3%, 5% and 7% TPC, and the systems were individually evaluated. In the other three systems, 1% trilithium citrate (TLC) was added to stabilize the systems for 72 hours. At the end of the 72 hours, a different amount of TLC was added to each system, i.e. 3%, 5% and 7%, and the systems were individually evaluated. The initial and final set for each is indicated in Table 4.

TABLE 4

|  | Initial Set | Final Set |
| --- | --- | --- |
| TRIPOTASSIUM CITRATE | | |
| 3% | 8 min | 12 min, 15 sec |
| 5% | 4 min, 45 sec | 7 min, 35 sec |
| 7% | 3 min, 10 sec | 5 min, 0 sec |
| TRILITHIUM CITRATE | | |
| 3% | 39 min | 1 hr, 40 min |
| 5% | 7 min | 13 min, 50 sec |
| 7% | 6 min, 30 sec | 9 min, 10 sec |

As can be seen from the above data, an increase in the activating amount of neutralized salt from 3% to 7% by weight, based on the weight of cement, causes an decrease in both the initial and final set times of a cementitious system stabilized with 1% by weight, based on the weight of cement, of neutralized salt.

EXAMPLE 6

Four mortars were prepared and a set of test specimen was cast for each in accordance with example 1 with the amount of dry materials as follows:

| Component | Amount (% by weight of dry materials) |
| --- | --- |
| Type II cement | 23 |
| Silica Sand | 75 |
| Silica Fume | 2 |

Water was added in an amount sufficient to yield a water to cement ratio of 0.35. Different total amounts of tripotassium citrate were added to each, i.e. 0%, 4.96%, 8% and 16% by weight, based on the weight of cement plus silica fume, respectively. The initial set, final set and compressive strength (C.S.) at various times were measured and are reported in Table 5.

TABLE 5

|  | 0% TPC | 4.96% TPC | 8% TPC | 16% TPC |
| --- | --- | --- | --- | --- |
| Initial Set | 2 hr, 48 min | 2 hr, 54 min | 3 min, 35 sec | 3 min, 17 sec |
| Final Set | 4 hr, 55 min | 5 hr, 7 min | 5 min, 55 sec | 6 min, 10 sec |
| 1 Hour C.S. (psi) | — | — | 1390 | 1411 |
| 1 Day C.S. (psi) | 2803 | 2960 | 3457 | 3503 |
| 7 Day C.S. (psi) | 4470 | 4640 | 4670 | 4510 |
| 28 Day C.S. (psi) | 5590 | 5485 | 5790 | 5830 |

EXAMPLE 7

This example demonstrates the affect rheology modifying materials have on the flow of a cementitious composition of the present invention as measured on a flow table conforming to ASTM C266. Three mortars were prepared in a manner similar to that of Example 6, with sufficient water to yield a water to cement ratio of 0.4% and a total of 8% TPC except that immediately after mixing 1% TPC for 1 minute, 7% additional TPC was added and the resulting mix mixed for 30 seconds. At the end of this time, 1% by weight poly(ethylene oxide) (PEO) based on the weight of cement (added as an aqueous solution containing 1% by weight PEO) and 1% by weight β-naphthalene sulphonate-formaldehyde condensate (BNS) (added as an aqueous solution containing 42% by weight BNS) were added to one of the compositions and to another, 1% carboxylated styrene-butadiene copolymer latex, available under the tradename TYCHEM® from Reichold Chemicals, Inc., Research Triangle Park, North Carolina (added as an aqueous solution containing 35% by weight of SBR). The flow of the mortar without an added rheology modifying material reached 150% at 2 drops of the flow table. The flow of the mortar with 1% PEO and 1% BNS reached 120% at 15 drops of the flow table and the flow of the mortar with 1% SBR latex reached 150% at 15 drops of the flow table. The above data indicate that the plasticizing effect of the mortar is decreased by the addition of a rheology modifying material.

We claim:

1. A method of controlling the hydration of a cementitious composition comprising the steps of:
   i) providing a cementitious composition containing an amount of a neutralized salt of a α-monohydroxy carboxylic acid effective to retard the cementitious composition, said carboxylic acid containing two or more carboxylic acid groups, and, subsequently,
   ii) adding an additional amount of said neutralized salt of a α-monohydroxy carboxylic acid or a second neutralized salt of a α-monohydroxy carboxylic acid in an amount sufficient to activate hydration of the retarded cementitious composition, said cementitious composition comprising hydraulic binder and water.

2. The method of claim 1 wherein the neutralized salt of a α-monohydroxy carboxylic acid is selected from the group consisting of neutralized salts of citric acid, malic acid and citramalic acid.

3. The method of claim 1 wherein the neutralized salt of the α-monohydroxy carboxylic acid in step i) is the same as the neutralized salt of the α-monohydroxy carboxylic acid in step ii).

4. The method of claim 3 wherein the neutralized salt is a neutralized salt of citric acid.

5. The method of claim 4 wherein the neutralized salt is tripotassium citrate.

6. The method of claim 4 wherein the neutralized salt is trilithium citrate.

7. The method of claim 1 wherein the neutralized salt of step i) is different from the neutralized salt of step ii).

8. The method of claim 1 wherein said cementitious composition additionally includes aggregate.

9. The method of claim 8 wherein the aggregate is sand.

10. The method of claim 1 wherein said cementitious system additionally includes silica fume.

11. A method for reclaiming concrete which comprises the steps of
   i) retarding the hydration of concrete to be reclaimed by adding to the concrete an amount of a neutralized salt of a α-monohydroxy carboxylic acid effective to retard the concrete, said carboxylic acid containing two or more carboxylic groups, and subsequently,
   ii) adding to said retarded concrete or to a retarded mixture thereof with fresh concrete an additional amount of said neutralized salt of a α-monohydroxy carboxylic acid or a second neutralized salt of a α-monohydroxy carboxylic acid in an amount effective to activate the hydration of the retarded concrete or a retarded mixture thereof with fresh concrete.

12. The method for reclaiming concrete according to claim 11 wherein the neutralized salt of a α-monohydroxy carboxylic acid is selected from the group consisting of neutralized salts of citric acid, malic acid and citramalic acid.

13. The method for reclaiming concrete according to claim 11 wherein the neutralized salt of α-monohydroxy carboxylic acid in step i) is the same as the neutralized salt of α-monohydroxy carboxylic acid in step ii).

14. The method for reclaiming concrete according to claim 13 wherein the neutralized salt is a neutralized salt of citric acid.

15. The method for reclaiming concrete according to claim 14 wherein the neutralized salt is tripotassium citrate.

16. The method for reclaiming concrete according to claim 14 wherein the neutralized salt is trilithium citrate.

17. The method for reclaiming concrete according to claim 11 wherein the additional amount of said neutralized salt of the α-monohydroxy carboxylic acid in ii) is added to said retarded mixture with fresh concrete.

18. The method for reclaiming concrete according to claim 17 wherein the weight percent of retarded concrete to fresh concrete is from 10% to 30% retarded concrete to about 70% to 90% fresh concrete.

19. A method of controlling the hydration of a cementitious composition according to claim 1 wherein the cementitious composition is conveyed through a delivery hose and pneumatically applied to a substrate by spraying it from a nozzle.

20. A method according to claim 19 wherein the neutralized salt of step i) is added to the cementitious composition prior to being introduced into said delivery hose, and said neutralized salt of step ii) is added into the cementitious composition in the delivery hose.

21. A method according to claim 20 wherein the neutralized salt of step ii) is added into the cementitious composition in the delivery hose at some point prior to passage of the cementitious composition into the nozzle.

22. A method according to claim 20 wherein the neutralized salt of step ii) is added into the cementitious composition in the delivery hose at the nozzle.

23. A method according to claim 19 wherein the neutralized salt of α-monohydroxy carboxylic acid in step i) is the same as the neutralized salt of α-monohydroxy carboxylic acid in step ii).

24. A method according to claim 23 wherein the neutralized salt is a neutralized citric acid salt.

25. A method according to claim 24 wherein the neutralized citric acid salt is potassium citrate.

26. A method according to claim 19 wherein the cementitious composition additionally includes aggregate.

27. A method according to claim 26 wherein the aggregate is sand.

28. A method according to claim 19 wherein a rheology modifying material is additionally added into the cementitious composition.

29. A method according to claim 28 wherein the rheology modifying material is added into the cementitious composition with the activating amount of said neutralized salt.

30. A method according to claim 28 wherein said rheology modifying material is selected from the group consisting of lignosulphonates, melamine sulphonate formaldehyde condensates, polycarboxylates and styrene-maleic anhydride copolymers in free acid or salt form; cellulosic materials; gums and clays; polyacrylic acids having weight average molecular weights in excess of 50,000; and modified styrene-butadiene rubber latexes.

31. A method according to claim 1 wherein the hydraulic binder is hydraulic cement.

32. A method according to claim 30 wherein said rheology modifying material is a modified styrene-butadiene rubber latex.

33. A method according to claim 32 wherein said modified styrene butadiene rubber latex is carboxylated styrene-butadiene copolymer latex.

* * * * *